United States Patent
Ric

(10) Patent No.: US 7,907,545 B2
(45) Date of Patent: Mar. 15, 2011

(54) SWITCHING DEVICE ADAPTED TO SWITCH AN AIRCRAFT WIRELESS NETWORK FROM A MAINTENANCE CONFIGURATION TO A COMMERCIAL CONFIGURATION AND VICE-VERSA

(75) Inventor: Georges Ric, Toulouse (FR)

(73) Assignee: AIRBUS France, Toulouse (FR)

( * ) Notice: Subject to any disclaimer, the term of this patent is extended or adjusted under 35 U.S.C. 154(b) by 55 days.

(21) Appl. No.: 12/357,657

(22) Filed: Jan. 22, 2009

(65) Prior Publication Data

US 2009/0196201 A1 Aug. 6, 2009

(30) Foreign Application Priority Data

Feb. 1, 2008 (FR) ...................................... 08 50653

(51) Int. Cl.
*H04L 12/28* (2006.01)
*H04L 12/26* (2006.01)
*H04H 20/67* (2008.01)
*B64D 11/00* (2006.01)

(52) U.S. Cl. ...... 370/254; 370/339; 370/401; 244/118.5

(58) Field of Classification Search .................. None
See application file for complete search history.

(56) References Cited

U.S. PATENT DOCUMENTS

| 6,477,152 | B1 * | 11/2002 | Hiett | 370/316 |
|---|---|---|---|---|
| 6,990,338 | B2 * | 1/2006 | Miller et al. | 455/431 |
| 7,532,604 | B2 * | 5/2009 | Eglin | 370/338 |
| 2002/0173315 | A1 * | 11/2002 | Chmaytelli et al. | 455/453 |
| 2003/0003872 | A1 | 1/2003 | Brinkley et al. | |
| 2005/0149238 | A1 | 7/2005 | Stefani et al. | |
| 2007/0004363 | A1 * | 1/2007 | Kusaka et al. | 455/269 |
| 2008/0049768 | A1 * | 2/2008 | Seo et al. | 370/401 |
| 2008/0261647 | A1 * | 10/2008 | Hamada | 455/550.1 |

FOREIGN PATENT DOCUMENTS

WO   WO 2007060734 A1 *   5/2007

OTHER PUBLICATIONS

Airlines Electronic Engineering Committee, "ARINC Characteristic 763-2 © Network Server System", Nov. 21, 2001, 92 pages.

* cited by examiner

*Primary Examiner* — Daniel J Ryman
*Assistant Examiner* — Cassandra Decker
(74) *Attorney, Agent, or Firm* — Oblon, Spivak, McClelland, Maier & Neustadt, L.L.P.

(57) ABSTRACT

An aircraft wireless network in an aircraft includes a maintenance server, a cabin server, a radio switch, a network switch, and a cabin access point. The network switch and radio switch are configured to arrange the aircraft wireless network according to at least two distinct configurations. In a first configuration the cabin server is permitted to connect to the at least one cabin access point by the network switch and a first aircraft access point is connected to the external antenna by the radio switch. In a second configuration the maintenance server is permitted to connect to the at least one cabin access point by the network switch and a second aircraft access point is connected to the external antenna by the radio switch. In the first and second configurations the maintenance and cabin servers are prohibited from simultaneously connecting to the at least one cabin access point.

15 Claims, 4 Drawing Sheets

SWITCHING DEVICE ADAPTED TO SWITCH AN AIRCRAFT WIRELESS NETWORK FROM A MAINTENANCE CONFIGURATION TO A COMMERCIAL CONFIGURATION AND VICE-VERSA

TECHNICAL FIELD OF THE INVENTION

The present invention relates in general to on-line maintenance operations for aircraft and more particularly to a switching device adapted to switch an aircraft wireless network from a maintenance configuration to a commercial configuration and vice versa.

To optimize the reliability of aircraft and increase their profitability, on-line maintenance operations are frequently performed between the flying phases.

PRIOR ART

In general, such operations, in the case of maintenance operators, for example, consist in analyzing data stored in memory during flight and in modifying certain parameters of the aircraft. The analyzed data are often obtained from transducers and stored in memory in a central diagnostic and storage device accessible via a man-machine interface of MCDU type (initials for Multi-Control Display Unit in English terminology) or of OMT type (initials for Onboard Maintenance Terminal in English terminology). This interface, via which interactive operations can be launched, makes it possible to analyze data stored in memory and to access parameters of the aircraft. By way of illustration, the Airbus A320, A330 and A340 are equipped with MCDUs and the Airbus A380 is equipped with an OMT (Airbus, A320, A330, A340 and A380 are trademarks).

Thus, when the aircraft is on the ground, a maintenance operator can board the aircraft to access and analyze the data stored in memory and if necessary to modify the parameters of the aircraft.

Alternatively, mobile stations are being used to respond to an increasing demand of the airline companies as regards shortening the time for on-line maintenance operations. Such stations, whose purpose is similar to that of the interfaces of MCDU or OMT type, are connected to the central diagnostic and storage device via connection outlets connected to the network of the aircraft.

FIG. 1 illustrates an example of an aircraft 100 comprising a central diagnostic and storage device 105 connected to connection outlets 110-1 to 110-3. In this case, outlets 110-1 and 110-3 are accessible from the outside of aircraft 100, while outlet 110-2 is accessible from the cockpit.

Device 105 is, for example, connected to control transducers (not illustrated) of the engines and to actuators of the landing gear and control surfaces.

An on-line mobile maintenance station 115 is connected to device 105 via outlet 110-1 and the communication network (not illustrated) of aircraft 100.

Thus, when aircraft 100 is on the ground, a maintenance operator is able, by means of mobile station 115, to analyze the flight data of the aircraft and to modify the parameters thereof.

Although this solution meets the expectations of the airline companies, it is necessary to use a hard-wired link between an aircraft and a station to achieve on-line maintenance operations. Such a constraint has the effect in particular of prolonging the duration of maintenance operations and consequently increasing the costs of operating the aircraft.

To alleviate these disadvantages, there exist diagnostic systems that use a wireless communication technology, wherein the data obtained from transducers can be transmitted directly to the mobile on-line maintenance station. For example European Patent 1306305 discloses a system in which the transducers are connected to data storage and transmission devices. In this way, a mobile station is able to obtain flight data on request.

However, such a system is limited to accessing data without permitting modification of the parameters of an aircraft, and it necessitates the use of several storage and transmission devices.

The invention is able to solve at least one of the problems mentioned in the foregoing.

OBJECT OF THE INVENTION

The object of the invention is therefore a switching device in an aircraft wireless network, the said aircraft comprising a maintenance server and a wireless network, whose infrastructure comprises at least one cabin access point connected to at least one internal antenna and one cabin server connected to the said access point, this device comprising network switching means making it possible to modify the configuration of the said wireless network according to at least two distinct configurations, a first of the said at least two configurations permitting establishment of a connection between the said cabin server and the said cabin access point and a second of the said at least two configurations permitting establishment of a connection between the said maintenance server and the said cabin access point, the said maintenance and cabin servers being unable to be connected simultaneously to the said cabin access point.

Thus the device according to the invention makes it possible to modify the use of the wireless network deployed in the cabin and dedicated to the use of the passengers in such a way that a maintenance station can take advantage of the wireless mobility during an intervention. This mobility is assured in the interior of the aircraft.

Advantageously, the said infrastructure comprises at least one aircraft access point connected to at least one external antenna, the device additionally comprising the following means, communication means adapted to establish a junction between a server and an antenna in order to establish a wireless connection; and radio switching means making it possible to modify the configuration of the said wireless network according to at least two distinct arrangements, a first of the said at least two arrangements permitting establishment of a link between the said aircraft access point and the said at least one external antenna and a second of the said at least two arrangements permitting establishment of a link between the said communication means and the said at least one external antenna, the said aircraft access point and the said communication means being unable to be connected simultaneously to the said at least one external antenna.

The device according to the invention therefore permits a user to move around outside the aircraft in a nearby environment while still remaining connected.

According to a particular embodiment, the said at least one aircraft access point is connected to at least one second antenna independently of the said radio switching means to permit the said aircraft access point to exchange data regardless of the configuration of the said radio switching means.

Advantageously, the said first arrangement is associated with the said first configuration and the said second arrangement is associated with the said second configuration, in order to change over from a normal mode of use to a maintenance mode and vice versa.

According to a particular embodiment, the device additionally comprises alerting means adapted to alert at least one crew member of the said aircraft when the configuration of the said wireless network corresponds to the said second configuration and when a predetermined condition is satisfied. Advantageously, the said predetermined condition comprises a configuration duration. Thus, if the maintenance mode has been selected for a time exceeding a predetermined threshold, the said at least one crew member is forewarned that the normal mode of use is not selected.

According to another particular embodiment, the said wireless network is at least partly a network of WiFi type.

Another object of the invention is a method for employing the device described in the foregoing as well as an aircraft comprising the device described in the foregoing.

BRIEF DESCRIPTION OF THE DRAWINGS

Other advantages, objectives and characteristics of the present invention will become apparent from the detailed description provided hereinafter by way of non-limitative example, with reference to the attached drawings, wherein.

DETAILED DESCRIPTION OF THE INVENTION

According to the invention, a shared infrastructure employed in an aircraft is used for maintenance operations and for commercial communications, or in other words for data transmissions involving the personal devices of the passengers. A switchable wireless network makes it possible to offer an access point exclusively either to the passengers or to the maintenance operators.

Figure 1:
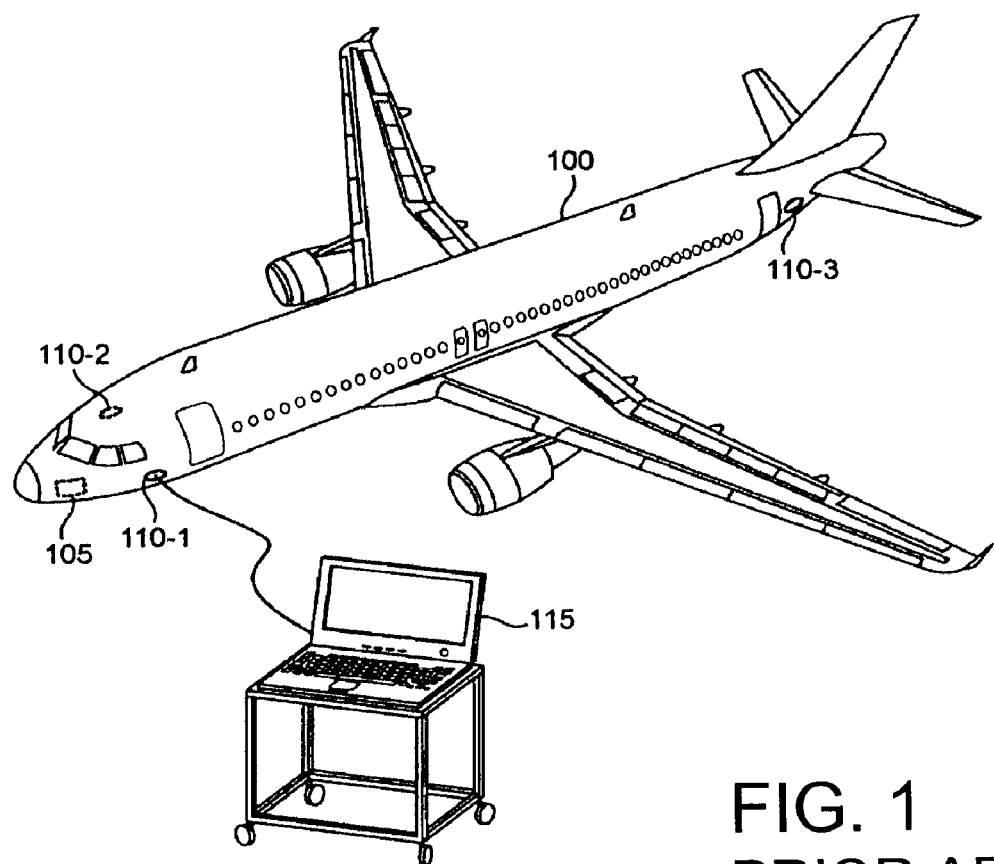
FIG. 1 represents an aircraft and a mobile station making it possible to analyze the flight data thereof and to modify the parameters of those data according to a standard scheme.
Figure 2:
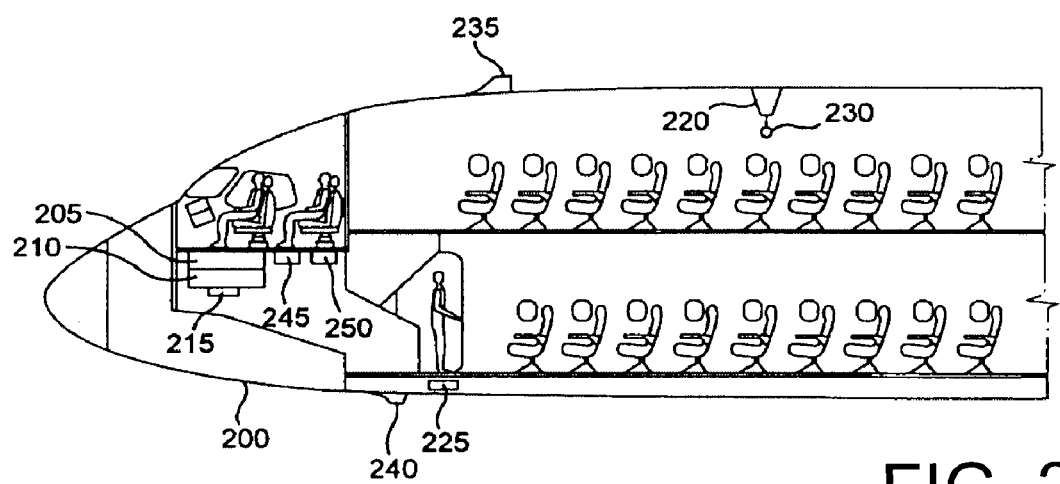
FIG. 2 schematically illustrates a partial section of an aircraft 100 comprising elements of an infrastructure adapted for employment of the invention.

FIG. 2 schematically illustrates a partial section of an aircraft 200 comprising elements of an architecture adapted to employ the invention. In this case this infrastructure comprises two servers, one server 205 dedicated to maintenance operations, referred to as maintenance server, and one server 210 dedicated to commercial operations, referred to as cabin server.

The notion of server here is a general notion, and each of servers 205 and 210 may be a single server or a group of servers.

The infrastructure also comprises three access points 215, 220 and 225 for a wireless network, for example WiFi access points according to the 802.11a, b or g standard, and three antennas 230, 235 and 240. In this case, antenna 230 is placed inside the aircraft, while antennas 235 and 240 are placed outside the latter.

The infrastructure also comprises a network switch 245, such as an Ethernet switch, as well as a radio-frequency relay 250 also referred to as a radio switch. The positions or configurations of network switch 245 and of radio-frequency relay 250 are preferably controlled by a sole command accessible from the cockpit. Such a command may result, for example, from the position of a button, or be generated by an instruction originating from a calculator, if necessary by means of a user interface.

It should be noted here that, except for network switch 245, the radio-frequency relay and access point 215, all the elements necessary for employment of the invention are already present in certain aircraft.

Figure 3A:
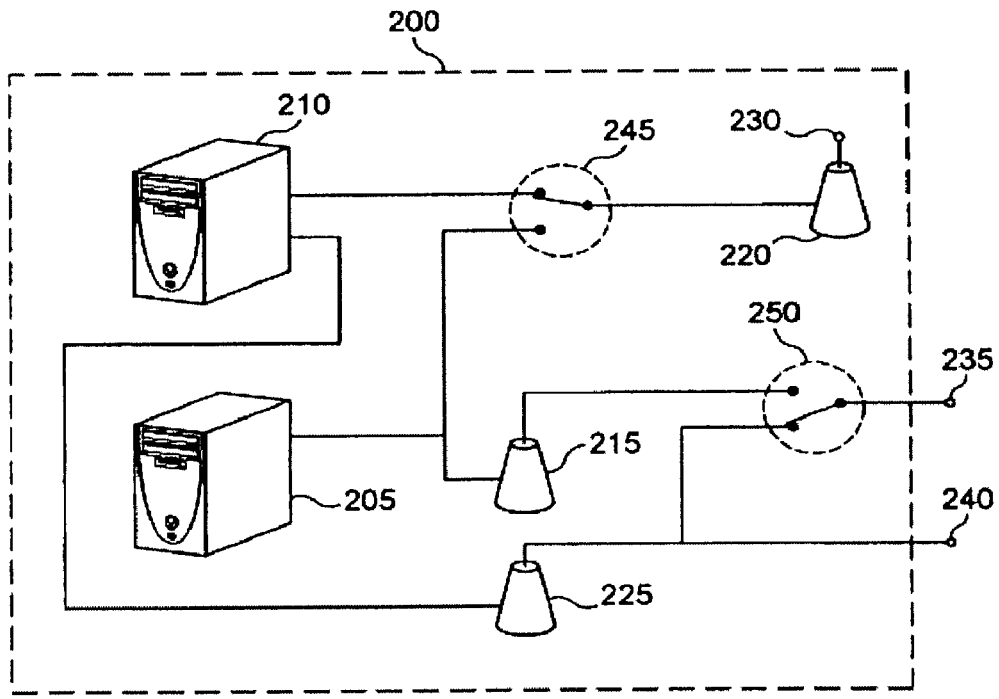
FIG. 3, comprising FIGS. 3a and 3b, schematically represents a part of the infrastructure, partially illustrated in FIG. 2, for applying the invention according to a maintenance configuration and according to a commercial configuration respectively.
Figure 3B:
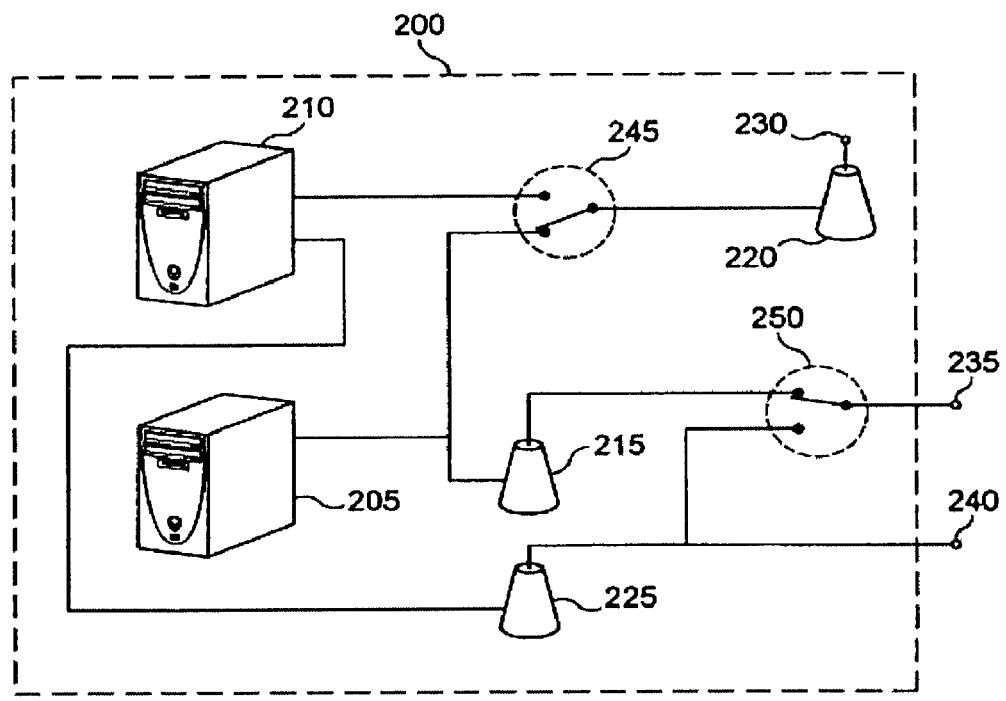

FIG. 3, comprising FIGS. 3a and 3b, schematically represents part of the infrastructure, partially illustrated in FIG. 2, used to apply the invention according to a maintenance configuration and according to a commercial configuration respectively.

As illustrated, maintenance server 205 is connected to access point 215, referred to as MWLU (initials for Maintenance Wireless Lan Unit in English terminology) and to network switch 245, which in turn is connected to access point 220, referred to as CWLU (initials for Cabin Wireless Lan Unit in English terminology) or cabin access point, whose antenna is antenna 230. The cabin server is connected to access point 225, referred to as TWLU (initials for Terminal Wireless Lan Unit in English terminology) and to network switch 245. Thus, depending on the configuration of network switch 245, access point 220 is connected to maintenance server 205 or to cabin server 210.

Each of the antenna outputs of access points 215 and 225 is connected to an input of radio-frequency relay 250, whose output is connected to antenna 235. Thus, depending on the configuration of radio-frequency relay 250, antenna 235 is connected to access point 215 or to access point 225. The output of access point 225 is also connected to antenna 240.

In this way, the infrastructure of the wireless network, which can be switched by means of two control elements, makes it possible to use partly, for the maintenance operations, the wireless network access points usable by the passengers. In other words, when the aircraft is in "commercial" use, the wireless network is configured to be usable by the passengers, and when the airplane is in maintenance phase, the wireless network is switched so as to be usable by the maintenance operators. In this latter configuration, the extension of the wireless network to the outside of the airplane can be achieved via the use of the additional MWLU element.

FIG. 3a represents the infrastructure of the wireless network used in a configuration that permits commercial use of the network. According to this configuration, the network switch is in a position such that cabin server 210 is connected to the CWLU, or in other words to access point 220. Maintenance server 205 is then not connected to the CWLU.

Similarly, and still according to this configuration, the radio-frequency relay is in a position such that the antenna output of the TWLU, or in other words of access point 215, is connected to antenna 235. The antenna output of the MWLU is then not connected to antenna 235.

Thus the infrastructure of the wireless network is configured in this case according to a standard scheme, permitting the passengers to access cabin server 210 via access point 220 and antenna 230, the cabin server in turn being able to access a network outside the aircraft via access point 225 and antennas 235 and 240.

As illustrated in FIG. 3b, after activation of the control command in the cockpit to change over to maintenance configuration, network switch 245 points the connection of maintenance server 205 toward the cabin wireless network, or in other words toward access point 220 or CWLU. A network monitoring software program advantageously takes over configuring the wireless network in standard manner, to permit only connection of stations compatible with previously defined network security rules for maintenance use. In this case, the passenger stations are no longer able to access the wireless network.

At the same time, the control command configures radio-frequency relay 250 in order to connect antenna 235 present outside the aircraft to the MWLU, or in other words to the antenna output of access point 215. According to this configuration, it is still possible to effect data exchanges between the on-board devices and the ground via the TWLU, or in other words access point 225, by using only antenna 240.

MWLU 215 and CWLU 220 are advantageously configured by maintenance server 205 to be considered as the same wireless sub-network, thus permitting the mobile stations to function inside and outside the airplane without being disconnected. If necessary, it is also possible to adapt the output power of MWLU 215 to reduce the radio-frequency coverage to the close perimeter of the aircraft in order to minimize possible perturbations in the event that several aircraft of the same type are simultaneously in maintenance phase while being positioned close to one another.

As soon as the maintenance operations are terminated, the control command is used to reconfigure the infrastructure to the commercial configuration, such as illustrated in FIG. 3a.

In this way the network switch points the connection of cabin server 205 back to access point 220, while the radio-frequency relay cuts the link between MWLU 215 and antenna 235, in order to re-establish the link between TWLU 225 and antenna 235. The cabin server then advantageously reconfigures the cabin access point, or in other words the CWLU, so that it can be used by the passengers. At the same time, the mobile maintenance stations no longer have access to the maintenance server and to the associated applications.

If the control command is not activated to reconfigure the infrastructure after a maintenance operation, a warning preferably should be furnished to the pilot in order that the following flight may be operated under the optimal security conditions.

It should be noted that, although a single CWLU is illustrated in FIGS. 2 and 3, a plurality of CWLUs may be used. All the CWLUs are then connected to network switch 245. Alternatively, a plurality of network switches may be used.

Figure 4:
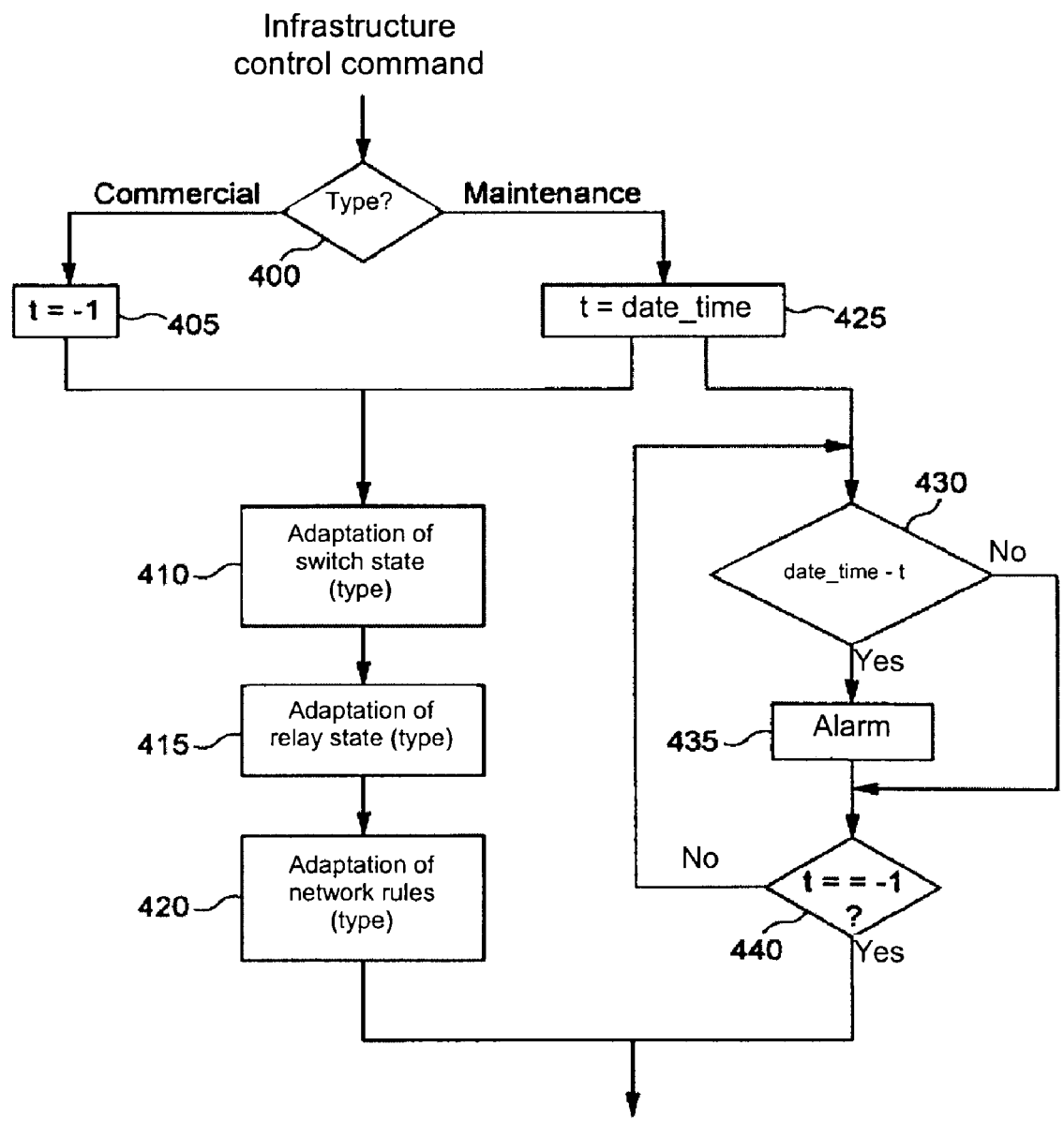
FIG. 4 illustrates some of the steps of an example of an algorithm that can be used to switch the infrastructure according to the invention from a maintenance mode to a commercial mode and vice versa.

FIG. 4 illustrates some of the steps of an example of an algorithm that may be used to switch the infrastructure according to the invention from a maintenance mode to a commercial mode and vice versa.

When a control command is transmitted, a test is performed (step 400) to determine whether the infrastructure must be changed over to a commercial configuration or to a maintenance configuration. Such a test may consist in particular of testing the current configuration or in determining a state of the control command, such as 0 or 1.

If the infrastructure must be changed over to a commercial configuration, a variable t is initialized to a predetermined value, such as −1 (step 405).

The state of the network switch is then modified (step 410), if necessary, to adapt the infrastructure of the wireless network to the desired configuration according to the type of command. In the present case, the network switch is placed in the configuration in which the cabin server is connected to the CWLU(s).

Similarly, the state of the radio-frequency relay is modified (step 415), if necessary, to adapt the infrastructure of the wireless network to the desired configuration, again according to the type of command. In the present case, the radio-frequency relay is placed in the configuration in which the antenna output of the TWLU is connected to a second external antenna.

The adaptation of the configuration of the network switch and of that of the radio-frequency relay may be simultaneous or sequential.

The new network rules are then employed (step 420) as a function of the type of command. In the present case, it is the cabin server that adapts the network rules according to a standard algorithm.

If the infrastructure must be changed over to a maintenance configuration, the variable t is initialized to a value representing the present instant (step 425).

The state of the network switch is then modified (step 410), if necessary, to adapt the infrastructure of the wireless network to the desired configuration according to the type of command. In the present case, the network switch is placed in the configuration in which the maintenance server is connected to the CWLU(s).

Similarly, the state of the radio-frequency relay is modified (step 415), if necessary, to adapt the infrastructure of the wireless network to the desired configuration, again according to the type of command. In the present case, the radio-frequency relay is placed in the configuration in which the antenna output of the MWLU is connected to an external antenna.

Once again, the adaptation of the configuration of the network switch and of that of the radio-frequency relay may be simultaneous or sequential.

The new network rules are then employed (step 420) according to the type of command. In the present case, it is the maintenance server that adapts the network rules according to a standard algorithm.

In parallel, after the variable t has been initialized, a test is performed (step 430) to determine if the difference between the value representing the present instant and the variable t is greater than a predetermined threshold $\theta$. In the affirmative, an alarm is generated (step 435) to indicate that the maintenance mode has been activated for too long and that it would be desirable to switch the wireless network to its commercial configuration.

Alternatively, if the difference between the value representing the present instant and the variable t is greater than a predetermined threshold $\theta$, it is possible to switch the wireless network automatically to its commercial configuration by generating the appropriate control command.

If the difference between the value representing the present instant and the variable t is smaller than or equal to a predetermined threshold $\theta$, or after an alarm has been generated, a test is performed (step 440) on the value of the variable t. The last three steps (steps 430 to 440) are repeated as long as the value of the variable t is different from the initialization value used when the wireless network is configured for commercial use.

Figure 5:
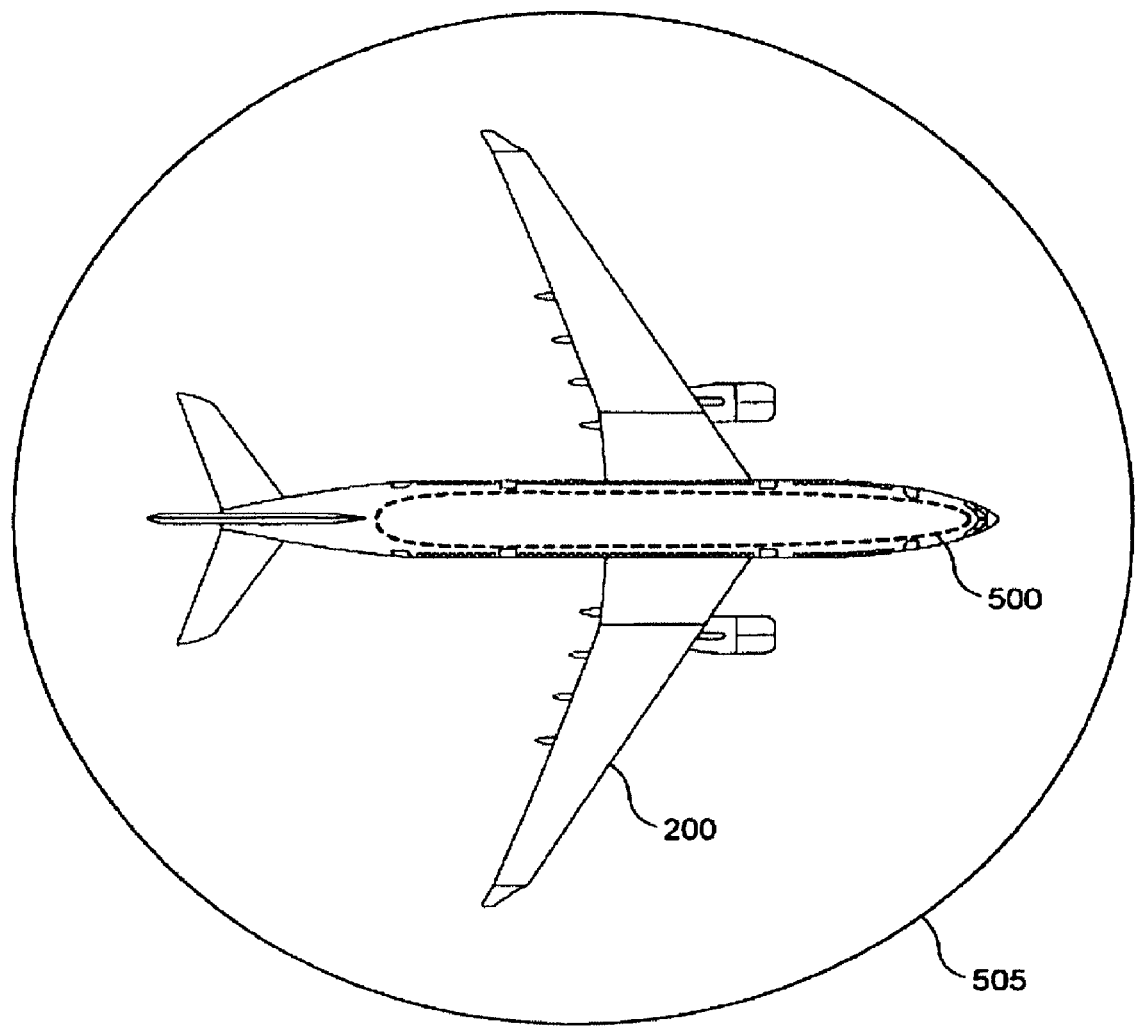
FIG. 5 schematically illustrates the zone of coverage of the wireless network in which a maintenance operator is able to access the central diagnostic and storage device.

FIG. 5 schematically illustrates the zone of coverage of the wireless network in which a maintenance operator is able to access the central diagnostic and storage device.

As represented, the zone of coverage of the wireless network comprises a first zone 500 inside the aircraft, where the operator is connected via the antenna or the antennas disposed inside the aircraft.

The zone of coverage of the wireless network also comprises a second zone 505 around the aircraft, where the operator is connected via the antenna or the antennas disposed outside the aircraft.

Naturally, to satisfy specific needs, a person skilled in the art of the invention will be able to apply modifications in the foregoing description.

The invention claimed is:

1. An aircraft wireless network in an aircraft, the aircraft wireless network comprising:
   a maintenance server;
   a cabin server;
   a radio switch connected to an external antenna, a first aircraft access point, and a second aircraft access point;
   a network switch; and
   at least one cabin access point connected to at least one internal antenna,
   wherein the network switch and the radio switch are configured to arrange the aircraft wireless network according to at least two distinct configurations, in a first configuration the cabin server is permitted to connect to the at least one cabin access point by the network switch and the first aircraft access point is connected to the external antenna by the radio switch, in a second configuration the maintenance server is permitted to connect to the at least one cabin access point by the network switch and the second aircraft access point is connected to the external antenna by the radio switch, and
   in the first and second configurations the said maintenance and cabin servers are prohibited from simultaneously connecting to the said at least one cabin access point.

2. The aircraft wireless network according to claim 1, wherein:
   the cabin server is connected to the first aircraft access point; and
   the maintenance server is connected to the second aircraft access point, wherein in the first configuration the cabin server is permitted to establish a wireless connection using the external antenna, in the second configuration the maintenance server is permitted to establish a wireless connection using the external antenna, and in the first and second configurations the first aircraft access point and the second aircraft access point are prohibited from simultaneously connecting to the external antenna.

3. The aircraft wireless network according to claim 2, wherein the first aircraft access point is connected to at least one second antenna independently of the radio switch.

4. The aircraft wireless network according to claim 2, further comprising a command generator that sets the configuration of the aircraft wireless network according to the first configuration or according to the second configuration.

5. The aircraft wireless network according to claim 2, wherein the at least one aircraft access point includes an access point according to the 802.11a b, or g standard.

6. The aircraft wireless network according to claim 1, wherein the at least one cabin access point includes an access point according to the 802.11a, b, or g standard.

7. An aircraft comprising the aircraft wireless network according to any one of claims 1-4 and 6.

8. A method for an aircraft wireless network in an aircraft, the aircraft wireless network comprising a maintenance server, a cabin server, a radio switch connected to an external antenna, a network switch, and at least one cabin access point connected to at least one internal antenna, the method comprising:
   arranging the wireless network according to a first configuration in which the cabin server is permitted to connect to the at least one cabin access point by the network switch and a first aircraft access point is connected to the external antenna by the radio switch;
   arranging the wireless network according to a second configuration in which the maintenance server is permitted to connect to the at least one cabin access point by the network switch and a second aircraft access point is connected to the external antenna by the radio switch; and
   prohibiting the maintenance and cabin servers from simultaneously connecting to the at least one cabin access point in the first and second configurations.

9. The method of claim 8, further comprising:
   determining a current configuration of the aircraft wireless network prior to setting the configuration of the aircraft wireless network according to the first or second configuration.

10. The method of claim 8, further comprising:
    connecting the cabin server to the first aircraft access point;
    connecting the maintenance server to the second aircraft access point;
    permitting the cabin server to establish a wireless connection using the external antenna in the first configuration;
    permitting the maintenance server to establish a wireless connection using the external antenna in the second configuration; and
    prohibiting the first aircraft access point and the second aircraft access point from simultaneously connecting to the external antenna in the first and second configurations.

11. The method of claim 8, further comprising:
    alerting at least one crew member of the aircraft when a predetermined condition is satisfied while the configuration of the aircraft wireless network corresponds to the said second configuration.

12. The method of claim 11, wherein the predetermined condition comprises a duration of remaining in the second configuration.

13. The method of claim 8, further comprising:
    connecting the first aircraft access point to at least one second antenna independently of the radio switch.

14. The method of claim 8, further comprising:
    generating a command that sets the configuration of the aircraft wireless network according to the first configuration or the second configuration.

15. The method of claim 8, further comprising:
    operating at least one of the cabin access point, the first aircraft access point, and the second aircraft access point as an access point according to the 802.11a, b, or g standard.

* * * * *